United States Patent Office 3,810,889
Patented May 14, 1974

3,810,889
IMINOISOINDOLINONE DYESTUFFS AND
PROCESS FOR THEIR MANUFACTURE
Ernst Model, Basel, and Jost von der Crone and Andre
Pugin, Riehen, Switzerland, assignors to Ciba-Geigy
Corporation, Ardsley, N.Y.
No Drawing. Filed May 5, 1972, Ser. No. 250,538
Claims priority, application Switzerland, May 28, 1971,
7,846/71
Int. Cl. C07d 27/50
U.S. Cl. 260—240 G        8 Claims

ABSTRACT OF THE DISCLOSURE

Iminoisoindolinone dyestuffs of the formula (1)
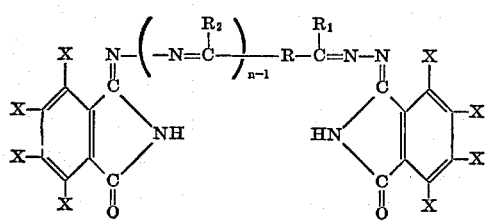

wherein R represents a direct bond, a carbocyclic or heterocyclic aromatic radical, $R_1$ and $R_2$ represent hydrogen atoms, alkyl or aryl radicals, the symbols X represent halogen atoms and $n$ represents 1 or 2, are valuable pigments coloring plastics and lacquers in yellow shades of outstanding fastness properties.

---

The present invention is based on the discovery that valuable new iminoisoindolinone dyestuffs of the formula (1)
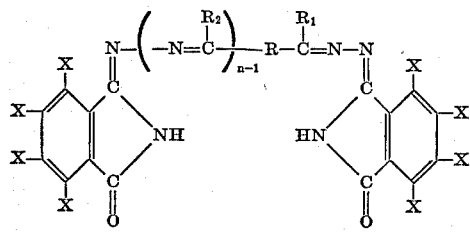

wherein R represents a direct bond, a carbocyclic or heterocyclic aromatic radical, $R_1$ and $R_2$ represent hydrogen atoms, alkyl or aryl radicals, the symbols X represent halogen atoms and $n$ represents 1 or 2, are obtained by (a) condensing a hydrazone of the formula

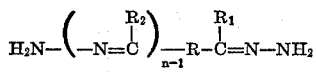

in the molar ratio 1:2 with a 4,5,6,7-tetrahalogeno-isoindolin-1-one which contains in the 3-position easily replaceable substituents which, occupy two linkages of the 3-positioned C-atom and are more mobile than the oxygen in the 1-position, or (b) condensing a compound of the formula

in the molar ratio 1:2 with a 4,5,6,7-tetrahalogeno-isoindolin-1-on-ylidene-3-hydrazone.

The dyestuffs according to the invention preferably correspond to the formula (4)
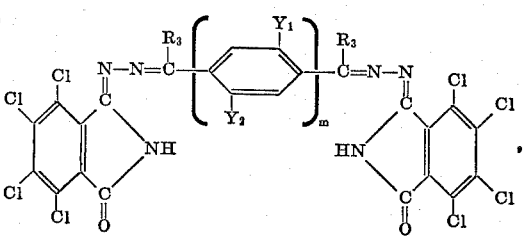

wherein $R_3$ represents a hydrogen atom, an alkyl group containing from 1 to 4 carbon atoms or a phenyl radical which is optionally substituted by halogen atoms or by alkyl or alkoxy groups containing from 1 to 4 carbon atoms, $Y_1$ and $Y_2$ represent hydrogen or halogen atoms or alkoxy groups containing from 1 to 4 carbon atoms, and $m$ represents 1 or 2, or correspond to the formula (5)
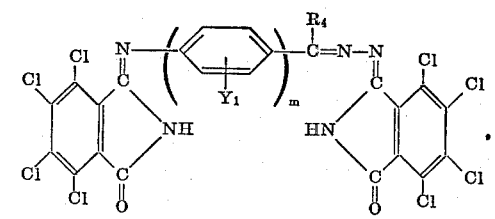

wherein $Y_1$ and $m$ have the meanings given hereinbefore and $R_4$ represents a hydrogen atom, an alkyl group containing from 1 to 4 carbon atoms, or in particular, a phenyl radical which is optionally substituted by halogen atoms, alkyl or alkoxy groups containing from 1 to 4 carbon atoms, or phenoxy groups or by a tetrachloroiminoisoindolinone radical.

The starting materials used are, for example 4,5,6,7-tetrabromoisoindolinones; but preferably they are 4,5,6,7-tetrachloroisoindolinones. As easily replaceable substituents in the 3-position, they contain, for example, two halogen atoms, in particular chlorine atoms, two secondary amino groups, for example piperidino or morpholino groups, an imino or a thio group or especially 2-alkoxy groups, for example those containing from 1 to 4 carbon atoms, in particular methoxy groups. These starting materials are known.

In the hydrazones of the Formula 2 which are likewise used as starting materials, R represents a direct bond or a carbocyclic or heterocyclic aromatic radical, in particular a benzene radical. The radical R may consist of two or more benzene radicals which may be linked with one another by a direct bond or a bridge, for example an oxygen or sulphur atom, an imino group or an alkylene group, or condensed to a heterocyclic or alicyclic ring. The radicals $R_1$ and $R_2$ of the Formula 2 represent hydrogen atoms, alkyl groups, in particular those containing from 1 to 4 carbon atoms, or aryl radicals, in particular benzene radicals which may be substituted, for example, by halogen atoms, alkyl or alkoxy groups containing from 1 to 4 carbon atoms or by a primary amino group. The hydrazones of the Formula 2 constitute for the most part known compounds which are obtained by condensing hydrazine with a compound of the formula

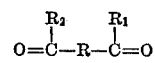

or

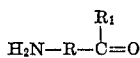

for example:

glyoxal
phthalaldehyde
isophthalaldehyde
terephthalaldehyde
4-methoxy-isophthalaldehyde
2,5-dimethoxyterephthalaldehyde
thiophene-2,5-dialdehyde
3-aminobenzaldehyde
4,4'-diphenyldialdehyde
4-aminobenzaldehyde
3- or 4-aminoacetophenone
diacetyl
1,4-diacetylbenzene
1,4-dipropionylbenzene
4,4'-diacetyldiphenyl
4,4'-dipropionyldiphenyl
4,4'-diacetyl-diphenyloxide
4,4'-diacetyl-diphenylsulphide
3,6-diacetyl-diphenyleneoxide
4-acetyl-benzophenone
4-propionyl-benzophenone
4-benzoyl-benzophenone
4,4''-dichloro-benzoylbenzophenone
3,3'',4,4''-tetrachlorobenzoylbenzophenone
2,2'',4,4''-tetrachlorobenzoylbenzophenone
2,2'',5,5''-tetrachlorobenzoylbenzophenone
2,2'',4,4'',5,5''-hexachlorobenzoylbenzophenone
4,4''-dimethyl-benzoyl-benzophenone
3,3'',4,4''-tetramethyl-benzoyl-benzophenone
2,2'',4,4''-tetramethyl-benzoyl-benzophenone
2,2'',5,5''-tetramethyl-benzoyl-benzophenone
4,4''-dimethoxy-benzoyl-benzophenone
2',5'-dimethoxy-benzoyl-benzophenone
3-amino-benzophenone
4-amino-benzophenone
4-amino-3',4'-dimethyl-benzophenone
4,4'-diaminobenzophenone
dibenzoyl.

The condensation takes place partially at low temperatures, optionally while heating the intimately mixed components, with particular advantage in the presence of inert organic solvents (i.e. which do not participate in the reaction).

If the starting materials are alkali salts (in particular the sodium salt) of 3,3-dialkoxy-4,5,6,7-tetrachloro-isoindolin-1-ones or 3-imino-, 3-thio- or 3,3-bis-tert.amino-4,5,6,7-tetrachloroisoindolin-1-ones, it is advantageous to use organic solvents which are miscible with water, e.g. lower aliphatic alcohols, such as alkanols, for example methanol, isopropanol or butanol, lower cyclic ethers, such as dioxan or ethylene glycol monomethyl ether, lower aliphatic ketones, such as acetone or lower fatty acids, for example acetic acid. The condensation takes place at relatively low temperatures. It is advantageous to carry out the process in the presence of base binding agents, as examples of which there may be cited lower fatty acids, which can then be used simultaneously as solvents, in particular acetic acid.

In using 3,3-dihalogeno-4,5,6,7-tetrachloroisoindolin-1-ones, organic solvents which are free from hydroxyl groups are preferred, such as hydrocarbons, for example aromatic hydrocarbons, such as benzene, toluene, xylene, tetrahydronaphthalene or diphenyl or cycloaliphatic hydrocarbons, for example cyclohexane, and also halogenated, such as aliphatic, hydrocarbons, for example carbon tetrachloride or tetrachloroethylene, or aromatic halogenated hydrocarbons, for example chlorobenzene or di- and trichlorobenzenes; also aromatic nitrated hydrocarbons, such as nitrobenzene; ethers, for example aliphatic ethers, such as dibutyl ether, aromatic ethers, such as diphenyl ether, or cyclic ethers, such as dioxan; and ketones, such as acetone, or esters, particularly esters of lower fatty acids with lower alkanols in the presence of acid binding agents.

The new pigment precipitates from the reaction medium immediatley after it has formed. It can be used direct as crude pigment for certain purposes; but it is also possible to improve its properties, in particular with regard to purity, form and hiding power, by methods which are known in the art, for example by crystallization or extraction with organic solvents or by grinding with grinding assistants which can be removed afterwards.

The new dyestuffs constitute very fast yellow to red pigments which, in finely divided form, may be used for pigmenting high molecular organic material for example cellulose ethers and esters, polyamides and polyurethanes or polyesters, acetyl cellulose, nitrocellulose, natural resins or synthetic resins, such as polymerization or condensation resins, for example aminoplasts, in particular urea and melamine-formaldehyde resins, alkyd resins, phenolic plastics, polycarbonates, polyolefins, such as polystyrene, polyvinyl chloride, polyethylene, polypropylene, polyacrylonitrile, polyacrylic esters, rubber, casein, silicone and silicone resins, individually or in mixtures. The pigments are distinguished in general by the purity of their shade, high tinctorial strength, good light fastness and heat resistance.

It is immaterial whether the cited high molecular compounds are in the form of plastics, melts, spinning solutions, lacquers and varnishes or printing inks. Depending upon the use to which they are put, it is advantageous to use the new pigments as toners or in the form of preparations.

The following examples illustrate the invention, the parts and percentages being by weight unless otherwise stated.

EXAMPLE 1

14.95 parts of 4,5,6,7 - tetrachloroisoindolin - 1 - on-3-ylidene-hydrazine are stirred with 200 parts by volume of o-dichlorobenzene and 3.35 parts of terephthalaldehyde are added at 60° C. While distilling off a small amount of water, the temperature is then increased to 140–145° C. and maintained for 2 hours. The product is then filtered off, washed with alcohol and acetone and dried in vacuo at 70° C., to give 16.9 parts of a brilliant, greenish yellow pigment which is excellently suitable for incorporation into plastics.

EXAMPLE 2

17.4 parts of 4,5,6,7-tetrachloro-3,3-dimethoxyisoindolin-1-one are dissolved in 55 parts by volume of N sodium methylate solution in methanol and the hot solution of 4.05 parts of terephthalaldehyde-bis-hydrazone in 100 parts by volume of methyl alcohol is stirred in. The sodium salt of the pigment precipitates after a brief time. The reaction mixture is heated to the boil for 1½ hours to the boil with good stirring, acidified with 20 parts by volume of glacial acetic acid, and kept at reflux temperature for a further 3 hours. The insoluble pigment is filtered off hot, washed with methanol and water and dried, to give 16.5 parts of the pigment described in Example 1.

The same result is obtained on using isopropanol or ethylene glycol monomethyl ether as solvent.

EXAMPLE 3

16 parts of 3,4,5,6-tetrachloro-2-cyanobenzoic acid methyl ester are stirred with 55 parts by volume of a N sodium methylate solution in methanol until a clear solution is obtained. In the process, the sodium salt of 3,3 - dimethoxy - 4,5,6,7-tetrachloroisoindolin-1-one is formed. Then 5.95 parts of the bis-hydrazone of 4,4'-diphenyldialdehyde (prepared from the dialdehyde with excess hydrazine) and 50 parts by volume of methanol are stirred in. The reaction mixture is stirred briefly to the boil, in the course of which the sodium salt of the pigment precipitates. The mixture is then diluted with 100 parts by volume of o-dichlorobenzene and the temperature is raised to 100° C. while distilling off methanol. Upon addition of a further 100 parts by volume of o-dichlorobenzene and 20 parts by volume of glacial acetic acid, the temperature is increased to 140–145° C. and maintained for 2 hours while stirring well. The insoluble pigment is filtered off at 120° C., washed with alcohol, acetone and water and dried, to give 17.4 parts of a brilliant yellow pigment which can be used direct in this form for coloring plastics with excellent fastness properties.

Pigments with similarly good fastness properties are obtained if equimolecular amounts of the hydrazones listed hereinbelow (in the case of very difficultly soluble compounds, appropriately with the addition of dioxan as hydrotropic agent or ethylene glycol monomethyl ether) are used instead of the bis-hydrazone:

| Example No. | Hydrazone | Shade |
|---|---|---|
| 4 | $NH_2-N=CH-$ (2,5-dimethoxyphenylene) $-CH=N-NH_2$ (with $OCH_3$ groups) | Red. |
| 5 | 1,4-phenylene bis($CH=N-NH_2$) | Greenish yellow. |
| 6 | 2-methoxy-1,4-phenylene bis($CH=N-NH_2$) ($OCH_3$ substituted) | Do. |
| 7 | $NH_2-N=CH-$(thiophene-2,5-diyl)$-CH=N-NH_2$ | Orange. |
| 8 | $NH_2-$(phenylene)$-CH=N-NH_2$ | Yellow. |
| 9 | $CH_3-C(=N-NH_2)-$(phenylene)$-C(=N-NH_2)-CH_3$ | Greenish yellow. |
| 10 | $NH_2-N=C(CH_3)-$(biphenylene)$-C(CH_3)=N-NH_2$ | Yellow. |
| 11 | $NH_2-N=C(C_2H_5)-$(biphenylene)$-C(C_2H_5)=N-NH_2$ | Greenish yellow. |
| 12 | $NH_2-N=C(CH_3)-$(phenylene)$-O-$(phenylene)$-C(CH_3)=N-NH_2$ | Do. |
| 13 | $NH_2-N=C(CH_3)-$(dibenzofuran-diyl)$-C(CH_3)=N-NH_2$ | Do. |
| 14 | 2-amino-phenyl $-C(CH_3)=N-NH_2$ | Do. |
| 15 | $NH_2-$(phenylene)$-C(CH_3)=N-NH_2$ | Reddish yellow. |
| 16 | $NH_2-N=C(C_6H_5)-$(phenylene)$-C(CH_3)=N-NH_2$ | Yellow. |
| 17 | $C_6H_5-C(=N-NH_2)-$(phenylene)$-C(=N-NH_2)-C_6H_5$ | Greenish yellow. |
| 18 | $CH_3O-$(phenylene)$-C(=N-NH_2)-$(phenylene)$-C(=N-NH_2)-$(phenylene)$-OCH_3$ | Do. |

TABLE—Continued

| Example No. | Hydrazone | Shade |
|---|---|---|
| 19 | Cl–C₆H₄–C(=N–NH₂)–C₆H₄–C(=N–NH₂)–C₆H₄–Cl | Greenish yellow. |
| 20 | (3,4-Cl₂–C₆H₃)–C(=N–NH₂)–C₆H₄–C(=N–NH₂)–(3,4-Cl₂–C₆H₃) | Do. |
| 21 | (2,4-Cl₂–C₆H₃)–C(=N–NH₂)–C₆H₄–C(=N–NH₂)–(2,4-Cl₂–C₆H₃) | Do. |
| 22 | (2,5-Cl₂–C₆H₃)–C(=N–NH₂)–C₆H₄–C(=N–NH₂)–(2,5-Cl₂–C₆H₃) | Do. |
| 23 | (2,4,5-Cl₃–C₆H₂)–C(=N–NH₂)–C₆H₄–C(=N–NH₂)–(2,4,5-Cl₃–C₆H₂) | Do. |
| 24 | CH₃–C₆H₄–C(=N–NH₂)–C₆H₄–C(=N–NH₂)–C₆H₄–CH₃ | Do. |
| 25 | (3,4-(CH₃)₂–C₆H₃)–C(=N–NH₂)–C₆H₄–C(=N–NH₂)–(3,4-(CH₃)₂–C₆H₃) | Do. |
| 26 | (2,4-(CH₃)₂–C₆H₃)–C(=N–NH₂)–C₆H₄–C(=N–NH₂)–(2,4-(CH₃)₂–C₆H₃) | Do. |
| 27 | (2,5-(CH₃)₂–C₆H₃)–C(=N–NH₂)–C₆H₄–C(=N–NH₂)–(2,5-(CH₃)₂–C₆H₃) | Do. |
| 28 | C₆H₅–C(=N–NH₂)–(2,5-(OCH₃)₂–C₆H₂)–C(=N–NH₂)–C₆H₅ | Do. |
| 29 | NH₂–C₆H₄–C(=N–NH₂)(C₆H₅) | Reddish yellow. |
| 30 | NH₂–C₆H₄–C(=N–NH₂)–(3,4-(CH₃)₂–C₆H₃) | Yellow. |
| 31 | (3-NH₂–C₆H₄)–C(=N–NH₂)(C₆H₅) | Reddish yellow. |

TABLE—Continued

| Example No. | Hydrazone | Shade |
|---|---|---|
| 32 | C₆H₅–C(=N–NH₂)–C(=N–NH₂)–C₆H₅ | Greenish yellow. |
| 33 | CH₃–C(=N–NH₂)–C(=N–NH₂)–CH₃ | Do. |
| 34 | NH₂–C₆H₄–C(=N–NH₂)–C₆H₄–NH₂ | Do. |
| 35 | (2-OCH₃, 4-CH₃O-C₆H₃)–C(=N–NH₂)–C₆H₄–C(=N–NH₂)–(2-OCH₃, 4-OCH₃-C₆H₃) | Do. |
| 36 | (3,4-(CH₃O)₂-C₆H₃)–C(=N–NH₂)–C₆H₄–C(=N–NH₂)–(3,4-(OCH₃)₂-C₆H₃) | Do. |
| 37 | (2,6-(OCH₃)₂-C₆H₃)–C(=N–NH₂)–C₆H₄–C(=N–NH₂)–(2,6-(OCH₃)₂-C₆H₃) | Do. |
| 38 | (2-OCH₃,4-Cl,5-OCH₃-C₆H₂)–C(=N–NH₂)–C₆H₄–C(=N–NH₂)–(2-OCH₃,4-Cl,5-OCH₃-C₆H₂) | Do. |
| 39 | C₆H₅–C(=N–NH₂)–C₆H₄–C₆H₄–C(=N–NH₂)–C₆H₅ | Do. |
| 40 | (2-Cl-C₆H₄)–C(=N–NH₂)–C₆H₄–C₆H₄–C(=N–NH₂)–(2-Cl-C₆H₄) | Do. |
| 41 | (4-Cl-C₆H₄)–C(=N–NH₂)–C₆H₄–C₆H₄–C(=N–NH₂)–(4-Cl-C₆H₄) | Reddish yellow. |
| 42 | NH₂–C₆H₄–C(=N–NH₂)–C₆H₄–C₆H₅ | Do. |
| 43 | NH₂–C₆H₄–C(=N–NH₂)–C₆H₄–Cl | Do. |
| 44 | NH₂–C₆H₄–C(=N–NH₂)–(3,4-Cl₂-C₆H₃) | Do. |
| 45 | NH₂–C₆H₄–C(=N–NH₂)–(3,4-(OCH₃)₂-C₆H₃) | Do. |
| 46 | NH₂–C₆H₄–C(=N–NH₂)–C₆H₄–CH₃ | Do. |
| 47 | NH₂–C₆H₄–C(=N–NH₂)–C₆H₄–OCH₃ | Do. |

TABLE—Continued

| Example No. | Hydrazone | Shade |
|---|---|---|
| 48 | $NH_2$–C$_6$H$_4$–C(=N–NH$_2$)–C$_6$H$_2$(OCH$_3$)(Cl)(OCH$_3$) | Yellow. |
| 49 | $NH_2$–C$_6$H$_4$–C(=N–NH$_2$)–C$_6$H$_2$(Cl)(OCH$_3$)(OCH$_3$) | Greenish yellow. |
| 50 | $NH_2$–C$_6$H$_3$(CH$_3$)–C(=N–NH$_2$)–C$_6$H$_4$–CH$_3$ | Do. |
| 51 | $NH_2$–C$_6$H$_3$(CH$_3$)–C(=N–NH$_2$)–C$_6$H$_3$(CH$_3$)–CH$_3$ | Yellow. |
| 52 | $NH_2$–C$_6$H$_3$(CH$_3$)–C(=N–NH$_2$)–C$_6$H$_4$–Cl | Reddish yellow. |
| 53 | $NH_2$–C$_6$H$_3$(CH$_3$)–C(=N–NH$_2$)–C$_6$H$_4$–OCH$_3$ | Do. |
| 54 | $NH_2$–C$_6$H$_3$(CH$_3$)–C(=N–NH$_2$)–C$_6$H$_3$(OCH$_3$)–OCH$_3$ | Do. |
| 55 | $NH_2$–C$_6$H$_4$–C$_6$H$_4$–C(=N–NH$_2$)–C$_6$H$_3$(OCH$_3$)–OCH$_3$ | Do. |
| 56 | $NH_2$–C$_6$H$_4$–C$_6$H$_4$–C(=N–NH$_2$)–C$_6$H$_5$ | Do. |
| 57 | $NH_2$–C$_6$H$_4$–C$_6$H$_4$–C(=N–NH$_2$)–C$_6$H$_4$–Cl | Greenish yellow. |
| 58 | $NH_2$–N=CH–C$_6$H$_2$(Cl)(Cl)–CH=N–NH$_2$ | Reddish yellow. |
| 59 | $NH_2$–C$_6$H$_4$–C$_6$H$_4$–C(=N–NH$_2$)–C$_6$H$_4$–CH$_3$ | Yellow. |
| 60 | $NH_2$–C$_6$H$_4$–C$_6$H$_4$–C(=N–NH$_2$)–C$_6$H$_3$(CH$_3$)–CH$_3$ | Reddish yellow. |
| 61 | $NH_2$–C$_6$H$_4$–C$_6$H$_4$–C(=N–NH$_2$)–C$_6$H$_4$–OCH$_3$ | Greenish yellow. |

TABLE—Continued

| Example No. | Hydrazone | Shade |
|---|---|---|
| 62 | 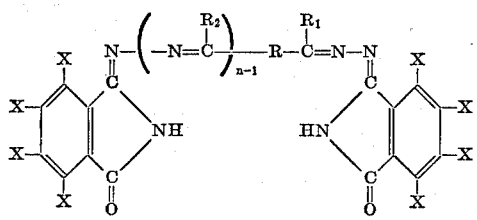 | Greenish yellow. |
| 63 | NH₂—⟨⟩—C(=N—NH₂)—⟨⟩—NH₂ with CH₃ groups | Reddish yellow. |

EXAMPLE 64

The process is carried out as described in Example 1, but using o-phthalaldehyde instead of terephthalaldehyde. A greenish yellow pigment with similar properties is obtained.

EXAMPLE 65

2 grams of the pigment manufactured according to Example 1 are mixed and ground with 36 g. of toner dehydrate, 60 g. of medium viscosity linseed oil varnish and 0.2 g. of cobalt linoleate in a three roll mill. The greenish yellow prints obtained with this pigment paste are of high tinctorial strength, pure and outstandingly fast to light.

EXAMPLE 66

0.6 gram of the pigment manufactured according to Example 3 is mixed with 67 g. of polyvinyl chloride, 33 g. of dioctyl phthalate, 2 g. of dibutyl tin dilaurate and 2 g. of titanium dioxide and the mixture rolled for 10 to 15 minutes. The resulting pure yellow polyvinyl chloride films are fast to migration, heat and light.

EXAMPLE 67

10 grams of titanium dioxide and 2 g. of the pigment manufactured according to Example 3 and listed in the table under 8) are ground for 48 hours in a ball mill with 88 g. of a mixture of 26.4 g. of coconut alkyl resin, 24.0 g. of melamine-formaldehyde resin (50% solids content), 8.8 g. of ethylene glycol monomethyl ether and 28.8 g. of xylene.

By spraying this varnish on aluminium foil and stoving it for 30 minutes at 120° C. after a pre-drying for 30 minutes at room temperature, a yellow varnish coating is obtained which is distinguished by very good fastness to over-varnishing and light and by very good weather-resistance.

What is claimed is:

1. An iminoisoindolinone dyestuff of the formula

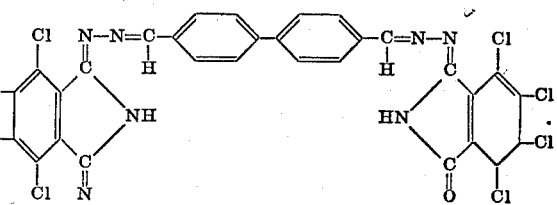

wherein R represents a direct bond, a carbocyclic or heterocyclic aromatic radical, $R_1$ and $R_2$ represent hydrogen, alkyl of 1 to 4 carbon atoms, phenyl or phenyl substituted by halogen, alkyl of 1 to 4 carbon atoms or alkoxy of 1 to 4 carbon atoms, the symbols X represent halogen and $n$ represents 1 or 2.

2. An iminoisoindolinone dyestuff of the formula

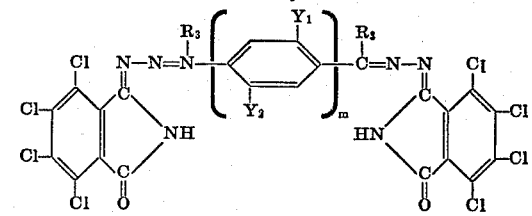

wherein $R_3$ represents a hydrogen atom, an alkyl group containing from 1 to 4 carbon atoms or a phenyl radical which is optionally substituted by halogen atoms or by alkyl or alkoxy groups containing from 1 to 4 carbon atoms, $Y_1$ and $Y_2$ represent hydrogen or halogen atoms or alkoxy groups containing from 1 to 4 carbon atoms and $m$ represents 1 or 2.

3. An iminoisoindolinone dyestuff of the formula

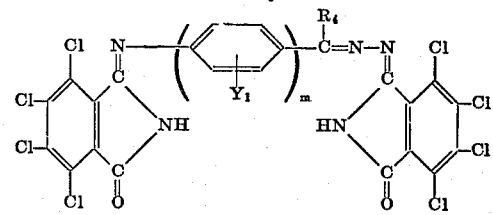

wherein $Y_1$ and $m$ have the meanings given in claim 2 and $R_4$ represents a hydrogen atom, an alkyl group containing from 1 to 4 carbon atoms or in particular represents a phenyl radical which is optionally substituted by halogen atoms, alkyl or alkoxy groups containing from 1 to 4 carbon atoms, or phenoxy groups or by a tetrachloroimino-isoindolinone radical.

4. The compound as claimed in claim 1 of the formula

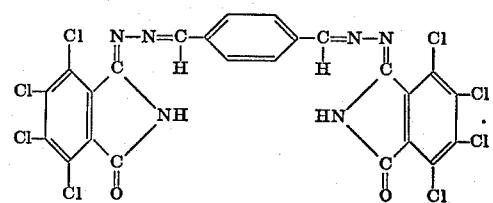

5. The compound as claimed in claim 1 of the formula

6. The compound as claimed in claim 1 of the formula
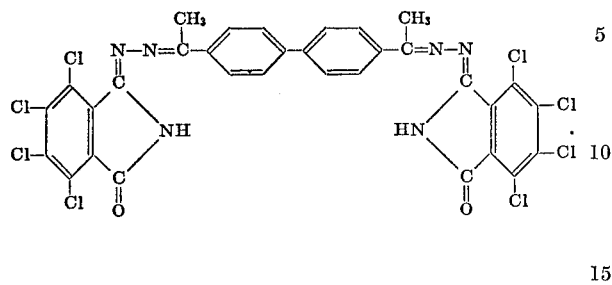
7. The compound as claimed in claim 1 of the formula
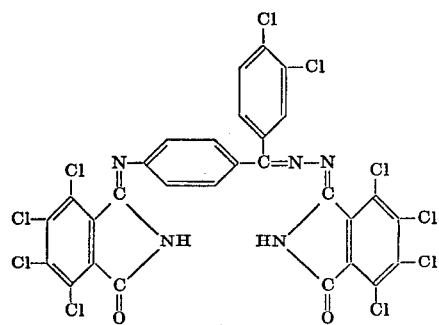
8. The compound as claimed in claim 1 of the formula
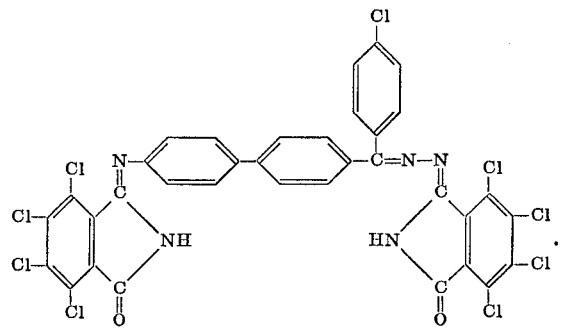
References Cited
UNITED STATES PATENTS
2,537,352   1/1951   Jones _____ 260—326.1
OTHER REFERENCES
Chemical Abstracts I, vol. 68, page 6791, abst. No. 70178s (1968).
Chemical Abstracts II, vol. 73, p. 69, abst. No. 46781r (1970).
JOHN D. RANDOLPH, Primary Examiner
U.S. Cl. X.R.
8—54.2, 162 B, 177 R, 178 R, 180; 106—23, 148, 176; 260—37 P, 38, 39 P, 326.1, 756